(12) United States Patent
Fleischer et al.

(10) Patent No.: US 7,526,617 B2
(45) Date of Patent: Apr. 28, 2009

(54) SYSTEM AND METHOD FOR MEMORY MANAGEMENT USING MEMORY WINDOWS

(75) Inventors: Christian Fleischer, Mannheim (DE); Jan Dostert, Nussloch (DE)

(73) Assignee: SAP AG, Walldorf (DE)

( * ) Notice: Subject to any disclaimer, the term of this patent is extended or adjusted under 35 U.S.C. 154(b) by 213 days.

(21) Appl. No.: 11/323,363

(22) Filed: Dec. 29, 2005

(65) Prior Publication Data

US 2007/0156973 A1 Jul. 5, 2007

(51) Int. Cl.
*G06F 12/10* (2006.01)
(52) U.S. Cl. ........................ 711/147; 711/170
(58) Field of Classification Search ........................ None
See application file for complete search history.

(56) References Cited

U.S. PATENT DOCUMENTS

| | | | | |
|---|---|---|---|---|
| 5,640,528 A | * | 6/1997 | Harney et al. | 711/206 |
| 5,649,142 A | * | 7/1997 | Lavelle et al. | 711/209 |
| 5,835,961 A | * | 11/1998 | Harvey et al. | 711/206 |
| 5,860,144 A | * | 1/1999 | Frank et al. | 711/206 |
| 5,873,120 A | * | 2/1999 | Harvey et al. | 711/173 |
| 5,873,127 A | * | 2/1999 | Harvey et al. | 711/206 |
| 5,884,313 A | * | 3/1999 | Talluri et al. | 707/10 |
| 5,887,134 A | * | 3/1999 | Ebrahim | 709/200 |
| 5,961,606 A | * | 10/1999 | Talluri et al. | 709/234 |
| 5,978,892 A | * | 11/1999 | Noel et al. | 711/170 |
| 6,014,710 A | * | 1/2000 | Talluri et al. | 709/237 |
| 6,049,808 A | * | 4/2000 | Talluri et al. | 707/201 |
| 6,055,617 A | * | 4/2000 | Kingsbury | 711/203 |
| 6,061,773 A | * | 5/2000 | Harvey et al. | 711/206 |
| 6,125,430 A | * | 9/2000 | Noel et al. | 711/152 |
| 6,490,671 B1 | * | 12/2002 | Frank et al. | 711/207 |
| 6,601,149 B1 | * | 7/2003 | Brock et al. | 711/154 |
| 6,615,383 B1 | * | 9/2003 | Talluri et al. | 714/749 |
| 2005/0091439 A1 | | 4/2005 | Mohideen et al. | |
| 2005/0193160 A1 | * | 9/2005 | Bhatt et al. | 711/3 |

FOREIGN PATENT DOCUMENTS

EP 0805398 A 11/1997

OTHER PUBLICATIONS

PCT International Search Report, International Application No. PCT/EP2006/012423—International Filing Date Dec. 21, 2006, 10 pgs.

* cited by examiner

*Primary Examiner*—Kevin Verbrugge
(74) *Attorney, Agent, or Firm*—Blakely, Sokoloff, Taylor & Zafman (57) ABSTRACT

A memory architecture includes at any given point in time a contiguous memory window located at a fixed virtual address space comprising a first context to be shared by a plurality of worker processes in an application server instance and at least a second context to be attached to only one of the plurality of worker processes in the application server instance.

16 Claims, 4 Drawing Sheets

SYSTEM AND METHOD FOR MEMORY MANAGEMENT USING MEMORY WINDOWS

FIELD OF INVENTION

The field of invention relates generally to memory management. In particular, the invention relates to allocation of shared and private (local) memory segments to a number of worker processes.

BACKGROUND

Many software applications need access to more information (whether program code or data) than can be stored in physical memory of the computing platform on which the applications run, especially when the operating system allows multiple processes/applications to run concurrently (e.g., a multitasking computing system). One solution to the problem of the maximum size of the physical memory being less than that needed for all concurrently running programs is for an application to keep some of its information in secondary storage, for example, on disk storage, and move the information back and forth to physical memory as needed. Virtual memory is one technique for providing such a solution.

Virtual memory, also referred to as virtual memory addressing, is a memory management technique used by computer operating systems so that non-contiguous memory is presented to a software application (a "process") as contiguous memory. The contiguous memory is referred to as the virtual address space for the process. Virtual memory addressing is commonly used in paged memory systems, and often combined with memory swapping, where memory pages stored in primary storage are written to secondary storage, thus freeing faster primary storage for other processes to use.

Virtual memory allows software to run in a virtual address space, or simply, address space, whose size and addressing methods may be independent of the computing platform's physical memory. A computer's hardware and operating system map virtual memory to physical memory and detect when an address is needed that does not currently relate to main memory so that data can be swapped in. Virtual memory makes it appear to software running on a computer as if the computer has a much larger main memory than it actually does and to lay out the address space as needed by the software.

Virtual memory provides the ability to simulate a main memory of any size, limited by the size of the addresses being used by the operating system and computing platform. On 32-bit address based computers, the total size of virtual memory is $2^{32}$, or approximately 4 Gigabytes, while 64 bit systems and operating systems use 64 or 48 bit addresses and can accommodate much more virtual memory. However, parts of the virtual address space are reserved so that, on most operating systems, the available address space for a process (i.e., a running software application) is limited to approximately 2 gigabytes. For larger applications, such as R/3, available from SAP AG, the assignee of this invention, running on 32-bit systems, this memory size becomes a crucial bottleneck.

SUMMARY

The invention relates to a memory architecture that provides, at any given point in time, a contiguous memory window located at a fixed virtual address space. The window comprises a shared memory context to be shared by a plurality of worker processes in an application server instance, and at least a second, private memory context to be attached to only one of the plurality of worker processes in the application server instance.

BRIEF DESCRIPTION OF THE DRAWINGS

A better understanding of the present invention can be obtained from the following detailed description in conjunction with the following drawings, in which.

DETAILED DESCRIPTION

Terminology

The use of virtual memory addresses requires the addresses in the virtual address space to be mapped to physical memory addresses. Typically, this mapping is done by the computing platform's operating system transparent to the software application running on the computing platform. Herein, a software application running on a computing platform, whether a physical computing platform, or a virtual machine such as a Java virtual machine (VM), is referred to as a process.

Allocating physical memory for a process involves:

reserving a memory segment in physical memory, and attaching the physical memory segment to the virtual address space, that is, reserving a memory segment of the same size in the virtual address space for the process, and mapping the virtual addresses to the corresponding physical addresses.

The operating system distinguishes between a process' local memory and shared memory, that is, memory shared by the process with at least one other process. Concerning a process' local memory, the above two steps of reserving and attaching is handled by the operating system transparently, for example, through an application programmatic interface (API)—only virtual memory is requested by the process, and the reserving of a memory segment in physical memory and attaching that memory segment is handled by the operating system.

When memory is shared, the two steps of reserving a physical memory segment and attaching the physical memory segment to the virtual address space are not transparent. First, an object representing the physical memory segment is created, which is then used by a process to map portions or the whole physical memory segment into the process' virtual address space.

Operating systems like Microsoft Windows NT and UNIX provide three mechanisms to share memory between different processes:

memory mapped files, in which a file is mapped into the virtual address space of a process. Internally, paging tables are changed to make the file serve as secondary or background storage. When accessing an address that a file is mapped to for the first time, the access causes a page fault, bringing the appropriate page from the file into the primary or main storage. Different processes may establish a mapping to the same, or to a part of the same file.

unnamed mapped files, sometimes referred to as anonymous memory, is a particular type of file mapping, in which a mapping is established between a process' address space and an anonymous region of physical memory, which can be shared among different processes. In contrast to normal file mapping, the memory from the process' point of view is not initialized from a file. A swap file serves as background storage for anonymous memory.

shared memory, which essentially is the same as unnamed mapped file. (For example, Microsoft Windows NT does not differentiate between anonymous mapped files and shared memory.)

Extended Memory Segments

Extended memory typically used for data, which:

can be mapped from one process' to another process' address space under the same address (referred to herein as "address stable mapping").

is isolated. The isolation of memory means that a process can only access the memory that it should access. For example, a process servicing a request should only access data corresponding to the request. Thus, isolation of memory prevents a program error that leads to a destruction or corruption of data not related to the process' request.

Figure 1:
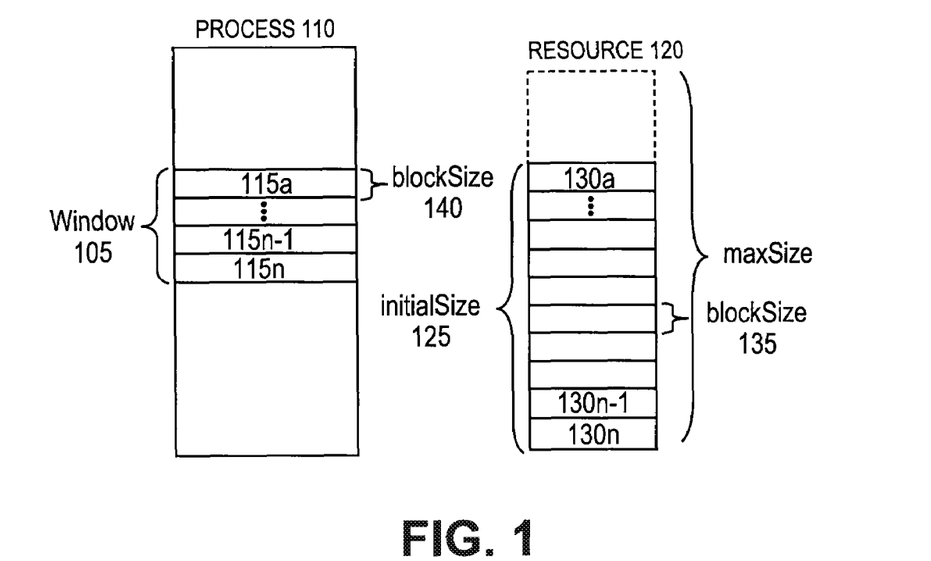
FIG. 1 illustrates an extended memory window and corresponding resource as used by an embodiment of the invention.

With reference to FIG. 1, an extended memory window 105 is a fixed and contiguous reserved area of memory of a certain size in the virtual address space of a process 110. In one embodiment, this area is at the same location in each process, and is divided into blocks, e.g., blocks 115 through 115n.

An extended memory resource 120 is a background resource (e.g., a named file, a pinned memory (a memory page that is in primary memory and not to be swapped with a memory page in a secondary memory), etc.) which is used to provide a back up resource for extended memory data. The extended memory resource may be set to an initial size 125, and be divided into blocks 130a through 130n of fixed size 135 that may be a multiple of an extended memory block size 140. The window block size (140) is not a fixed block size. If a context is mapped to a window, the window will use the block size of the resource of the context. For example, assume there are two resources (resource A with block size 1 megabytes (MB) and resource B with block size 2 MB), two contexts (context 1 which refers to resource A and context 2 which refers to resource B) and one window W. If context 1 is mapped to window W, the block size of the window is 1 MB. If context 2 is mapped to window W, the block size of the window is 2 MB.

Alternatively, the extended memory block size 140 may be a multiple of the resource block size 135. In any case, with reference to FIG. 2, resource blocks 130 (e.g., blocks 130b, 130x and 130n-1) may be mapped into an extended memory window 105 as part of an extended memory segment. For example, resource block 130b is mapped into segment 210a, comprising extended memory block 205a, whereas resource blocks 130x and 130n-1 are mapped to segment 210n, comprising extended memory blocks 205n-1 and 205n.

Figure 2:
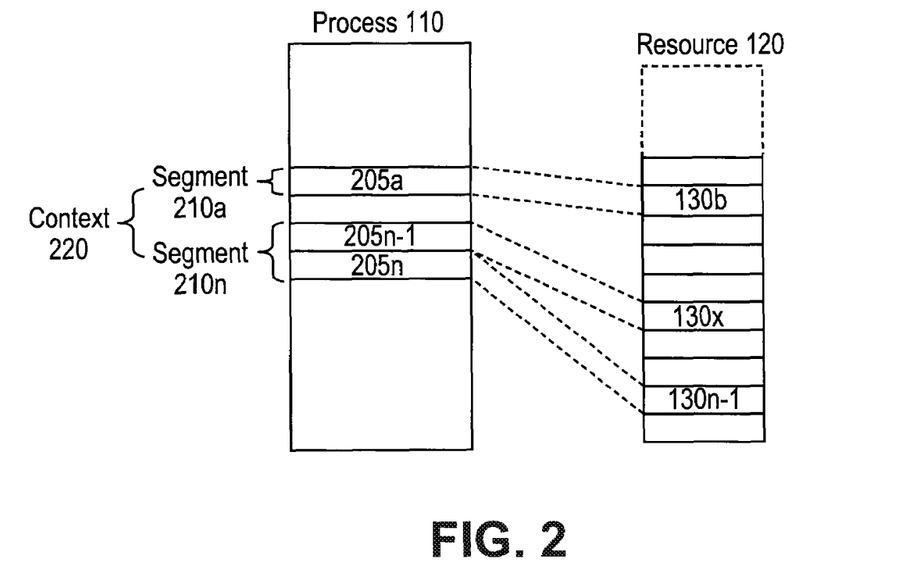
FIG. 2 illustrates an extended memory context and segment as contemplated by an embodiment of the invention.

Similar to a shared memory segment, an extended memory segment, e.g., segment 210n, is a memory segment comprising one or more contiguous blocks, e.g., 205n-1 and 205n, that is shared by all processes of a particular computing platform, e.g., worker processes running on Java virtual machines (VMs), the worker processes all belonging to a single J2EE application server instance. An advantage of an extended memory segment is that it can be attached to the same virtual address in each process. As illustrated in FIG. 2, a segment comprises of one or more blocks to which are mapped a number of extended memory resource blocks. While in the example illustrated in FIG. 2, the resource block size matches the extended memory block size, the block sizes may differ as previously described.

It should be noted that a virtual machine, as is well understood in the art, is an abstract machine that converts (or "interprets") abstract code into code that is understandable to a particular type of a hardware platform (e.g., a particular type of processor). Because virtual machines operate at the instruction level they tend to have processor-like characteristics, and, therefore, can be viewed as having their own associated memory. The memory used by a functioning virtual machine is typically modeled as being local (or "private") to the virtual machine.

An extended memory segment, e.g., 210a, belongs to an extended memory context, e.g., 220. An extended memory context comprises of one or more extended memory segments that logically belong together. An extended memory context need not occupy a contiguous memory area (as evidenced by the dis-contiguous segments 210a and 210n). In one embodiment of the invention, attaching and detaching operations (wherein memory is attached to or detached from a process) are performed on an extended memory context as a whole, that is, the operations are performed on all extended memory segments of an extended memory context. When an extended memory context is attached, the corresponding extended memory resource blocks are attached to the extended memory window.

An extended memory context may be either private (local) or shared (global). Shared extended memory contexts may be attached to several processes simultaneously whereas private extended memory contexts may be attached at most to one process at a given point in time. An extended memory template is a mapping between a name and an extended memory context. A template is used to create an exact copy (i.e., clone) of a context, as discussed further herein.

During startup of a computing platform, e.g., a J2EE application server instance, extended memory windows are created to reserve virtual address space in which to map extended memory contexts. These windows are maintained as the same location in memory for each process and therefore provide for address stable mapping when a context is detached from one process and attached to another process.

Figure 3:
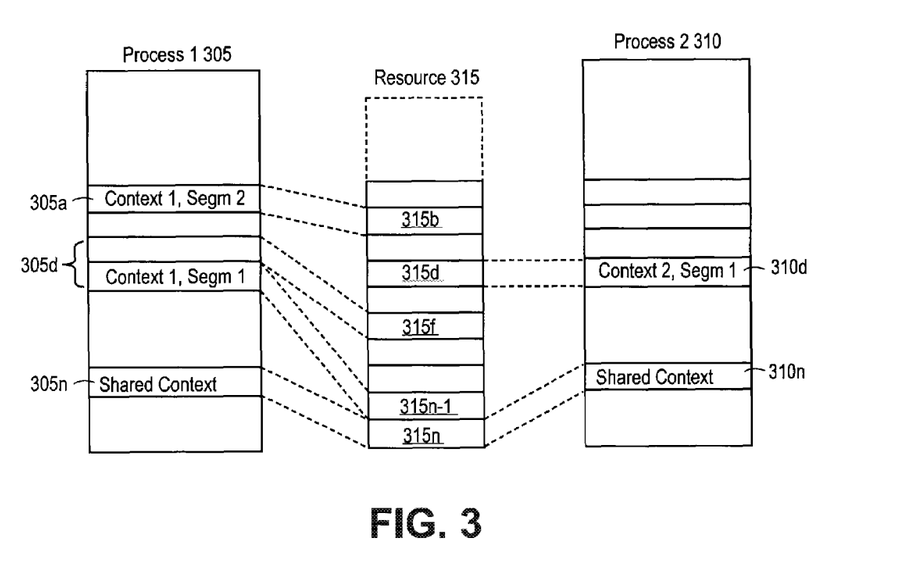
FIG. 3 illustrate attaching an resource to a context as contemplated by an embodiment of the invention.

FIG. 3 illustrates the virtual address space of two separate processes, process 1 (at 305) and process 2 (at 310). Blocks from extended memory resource 315 are attached to one or the other or both of the extended memory windows in each process' virtual address space. In this example there is one shared extended memory context and two private extended memory contexts. Private extended memory context 1 attached to process 1 comprises two extended memory segments 305a and 305d to which are respectively mapped extended memory resource blocks 315b and 315f, 315n-1. Private extended memory context 2 attached to process 2 comprises one extended memory segment 310*d* to which is mapped extended memory resource block 315*d*. The shared extended memory context is attached to both processes and comprises respective segments 305*n* and 310*n* to which is mapped extended memory resource block 315*n*.

Two private (local) extended memory segments of different extended memory contexts can have the same address. In the above example, process 305's segment 1 of context 1 at 305*d*, and process 310's segment 1 of context 2 at 310*d* have the same address. There is no conflict since, at any one point in time, a process has attached at most one extended memory context to an extended memory window.

In one embodiment, an extended memory context may be implemented as a list of one or more extended memory segments, and an extended memory segment, in turn, may be implemented as a list of one or more blocks of an extended memory resource. To this end, an extended memory context comprises an index in a block table of the extended memory resource. This index is for the first block of the first extended memory segment of the extended memory context. Each block of an extended memory segment, except its last block, has a link to the next block of the same segment. The last block in the linked list of blocks of an extended memory segment contains a pointer that points to the first block of the next extended memory segment of the same extended memory context. Likewise, the set of free blocks of an extended memory resource is implemented as a list of blocks.

In one embodiment, the address of an extended memory resource block is not fixed until it is allocated as part of an extended memory context. When an extended memory context is attached to a process, all its blocks are attached to the address that is stored in the block table of the extended memory resource.

To allocate a new extended memory segment of n blocks within a private extended memory context currently attached to a process, an extended memory manager works as follows. Firstly, it searches for an area of n free adjoining blocks in the extended memory window to which the extended memory context belongs. This area is reserved for the new extended memory segment. Secondly, the extended memory manager takes the first n blocks of the free list of the extended memory resource. Note that these blocks may or may not be adjoining in the extended memory resource. These n blocks then form the new private extended memory segment and are attached to the area previously reserved in the virtual address space for the process. For each of these n blocks, the extended memory manager calls the operating system function (e.g., an operating system memory manager) to attach the block. As a result, the addresses of these blocks are written into the block table.

When an extended memory manager receives a request to detach a private extended memory context from a process, all blocks of the context is detached. When a request to attach the same extended memory context to another process occurs, the blocks are attached again to the addresses which are stored in the block table. In this way, address stable memory is provided.

When the extended memory manager gets a request to free an extended memory segment, it inserts the blocks in the free list of the extended memory resource.

It should be appreciated that multiple windows may be provided for a particular process, with separate extended memory resources attached thereto. In one embodiment of the invention, a resource is not directly coupled with a window. A context may be attached to a window and the context uses the resource. For example, window W may attach blocks from a resource A as well as from a resource B, when a context which uses resource A is attached, or when a context which uses resource B is attached, to window W. An extended memory context can be mapped to any window in the process, or to another process as described above.

Extended Global Memory

Extended global memory is an alternative to a shared memory. Similar to a shared memory segment, an extended global memory context comprises one or more memory segments that are shared by all processes of a single computing platform, e.g., a single instance of a J2EE application server. One advantage of an extended global memory context is that it can be accessed by each process at the same address. There are two types of extended global memory contexts: a memory context, which is an address stable context, similar to a shared memory segment, as described above; and a heap context, which is an address stable context with a heap manager that provides for an address stable shared memory to be allocated and freed dynamically (a heap manager provides function like malloc/calloc/realloc/free to dynamically allocate memory and free memory from a context). The granularity of a context (i.e. the sizes in which the context grows and shrinks are in block sizes (which are in the order of megabytes), while the granularity of a heap manger is bytes. If there is an allocation request to the heap manager, it will manage the segments of the context and satisfy the allocation request). The heap manager is needed in one embodiment of the invention in which an application allocates requests for memory on the order of bytes, not megabytes.

Figure 7:
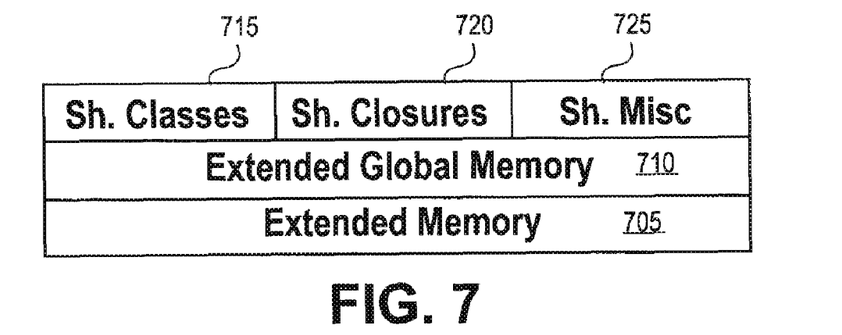
FIG. 7 illustrates an aspect of one embodiment of the invention.

With reference to FIG. 7, an extended global memory context may be implemented as a thin wrapper 710 around a shared extended memory context 705 in one embodiment of the invention. In the case of a heap context, a heap manager is used to manage fine granular memory allocations (e.g., allocations with a few bytes can be satisfied, where the extended memory layer 705 may only handle allocations with multiples of the block size.

Enhanced Extended Memory

Figure 8:
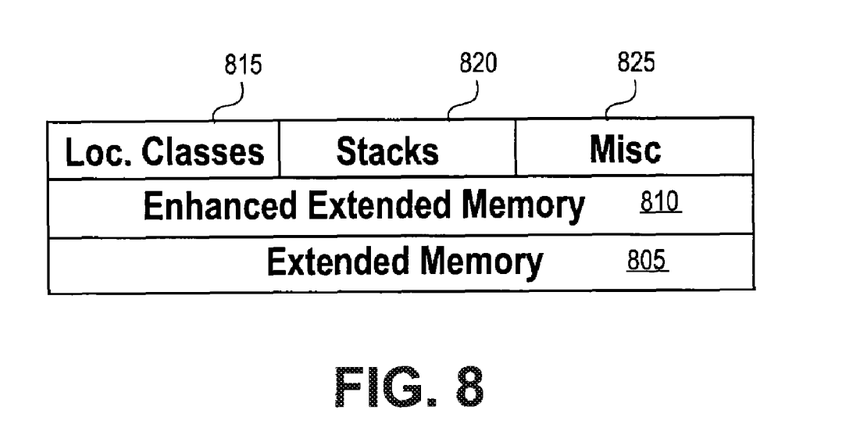
FIG. 8 illustrates an aspect of one embodiment of the invention.

Enhanced extended memory is based on extended memory in one embodiment of the invention. With reference to FIG. 8, where extended memory 805 handles operating system dependent operations, the enhanced extended memory layer 810 provides different extended memory contexts depending on the purpose for the context.

Two context types are contemplated by an embodiment of the invention:

memory context: in which address stable memory may grow and shrink within a memory window (e.g., used for a non-segmented growing Java heap);

heap context, which combines an address stable memory context with a heap manager, so that address stable memory may be allocated and freed dynamically. When an enhanced extended memory heap context is created, a private extended memory context is created by the extended memory manager, which is then used exclusively for that enhanced extended memory context. Initially, this extended memory context comprises a single extended memory segment. When the extended memory context runs out of memory, the enhanced extended memory manager sends a request to the extended memory manager to create another extended memory segment within the extended memory context.

Unlike an extended global memory context, an enhanced extended memory context is not accessible all the time. Before an enhanced extended memory context can be used, it must be attached first to a process. There are two implementations for enhanced extended memory:

map implementation: at most one extended memory context is mapped to an extended memory window at any point of time, thereby achieving isolation by virtue that only one context is mapped. This implementation involves a thin wrapper 910 around the functions provided by the extended memory layer 905.

flat implementation: due to limitations in some operating systems, which do not allow mapping different contexts to the same address in different processes, another implementation is needed. For example, operating systems, such as HP-UX available from Hewlett-Packard, Palo Alto, Calif., use shared paging tables for shared memory and memory mapped files, so virtual addresses used, for example, for a memory mapped file in one process are also reserved in another process and cannot be used for another mapping.

Figure 4:
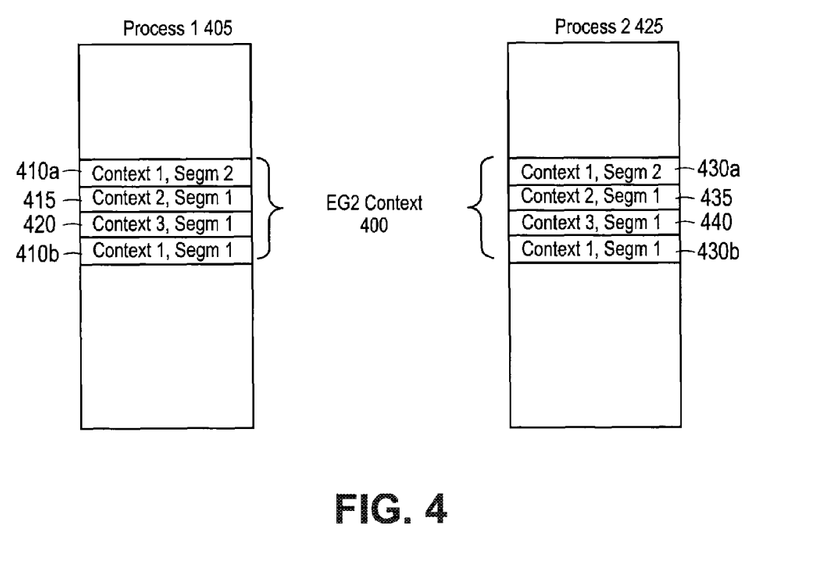
FIG. 4 illustrates an aspect of one embodiment of the invention.

In the flat implementation, illustrated in FIG. 4, an extended global memory heap context 400 is used. In this embodiment, all enhanced extended memory contexts are allocated within the extended global memory heap context. Initially, all addresses are protected. With an attachment of an enhanced extended memory context to a process, the context is made unprotected, and with a detachment of the enhanced memory context to a process, the context is protected again. With this realization, the available address space in a process is shared by all enhanced extended memory contexts.

FIG. 4 shows the address space of two processes 405 and 425. In this example, there are 3 enhanced extended memory contexts 1, 2 and 3. Enhanced extended memory context 1 comprises two extended memory segments (at 410a and 410b in process 405 and 430a and 430b in process 425), Enhanced extended memory context 2 at 415 and 425, and enhanced extended memory context 3 at 420 and 440, comprise one extended memory segment.

Process 1 at 405 attaches enhanced extended memory context 1 at 410a,b, while process 2 at 425 attaches enhanced extended memory context 3 at 440. Thus, in process 1, context 1 is unprotected, while context 2 and 3 are protected. Conversely, in process 2, context 3 is unprotected while context 1 and 2 are protected. Due to the fact that each context is located at different virtual addresses, context cloning is not possible in this embodiment.

Example Implementations of Extended Global and Enhanced Extended Memory

Figure 5:
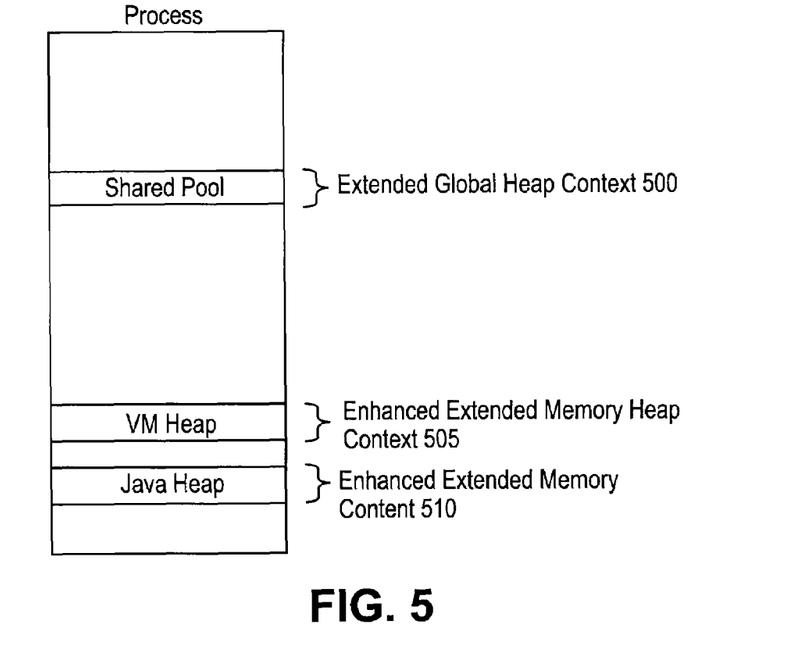
FIG. 5 illustrates an aspect of one embodiment of the invention.
Figure 6:
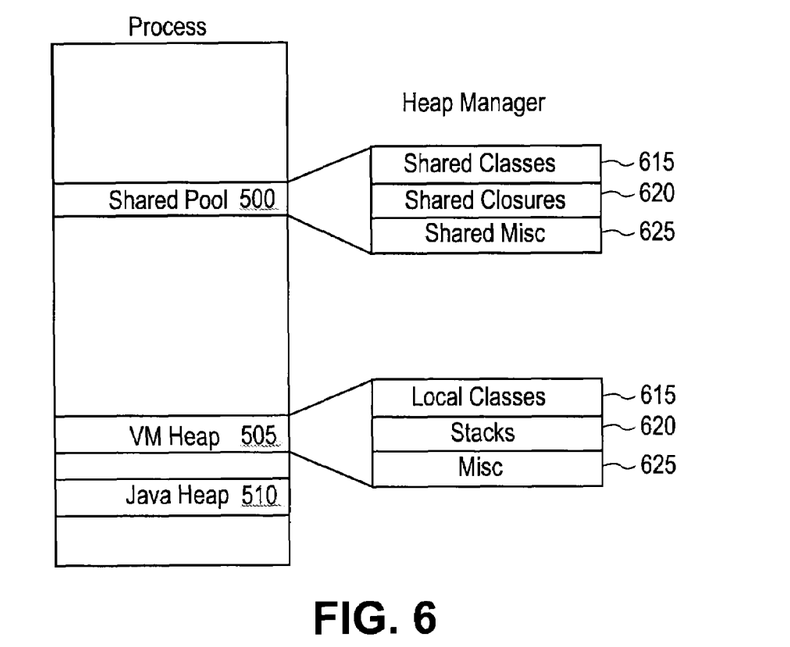
FIG. 6 illustrates an aspect of one embodiment of the invention.

FIGS. 5, 6 illustrate implementations of both the extended global memory context and enhanced extended memory contexts as described herein. It should be noted that the example implementations illustrate a VM Container with "rollable" VMs. However, in one embodiment, the VMs do not roll and the private data of a VM is process local memory.

A Java Virtual Machine Container makes use of an extended global memory heap context 500, which contains data shared by all Java virtual machines serviced by the container (e.g. shared classes 615, 715, shared closures 620, 720). The extended global memory heap context is created during startup of a J2EE application server instance and is attached in every worker process executing in a virtual machine, e.g., a Java virtual machine, serviced by the J2EE application server instance container.

With reference to FIGS. 5, 6 and 8, each worker process executing in a virtual machine (VM) further comprises an enhanced extended memory heap context 505, which contains the process' local data, like local classes 615, 815 or stacks 520, 820 and an enhanced extended memory context 510 which is used for the Java heap. These contexts are only attached when a Java request is processed. At most one context pair 505, 510 is attached in one worker process at any point of time (and a context pair is attached to at most one work process at any point of time). A worker process is able to attach different context pairs 505, 510 during its lifetime and a context pair can be attached to different work processes (at different points in time).

Attaching contexts to different work processes is termed context rolling wherein an attachment of a context pair 505, 510 is termed a roll-in and a detachment of a context pair is termed a roll-out. In this manner, process attachable virtual memories are implemented. Additionally, if a virtual memory address space is cloned, both the enhanced extended memory heap context and the enhanced extended memory context are cloned.

It should be noted that cloning involves allocating resource blocks, copying data from old resource blocks to new resource blocks, and creating a new context that maps the new resource blocks in the same manner as the old context maps the old resource blocks.

CONCLUSION

According to an object oriented approach where each of virtual machines does not have visibility into the local memories of the other virtual machines, specific rules are applied that mandate whether or not information is permitted to be stored in shared memory. Specifically, according to an embodiment, an object residing in shared memory should not contain a reference to an object located in a virtual machine's local memory because an object with a reference to an unreachable object is generally deemed "non useable".

That is, if an object in shared memory were to have a reference into the local memory of a particular virtual machine, the object is essentially non useable to all other virtual machines; and, if shared memory were to contain an object that was useable to only a single virtual machine, the purpose of the shared memory would essentially be defeated.

In order to uphold the above rule, and in light of the fact that objects frequently contain references to other objects (e.g., to effect a large process by stringing together the processes of individual objects; and/or, to effect relational data structures), "shared closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory, the closure itself would not be shareable with other virtual machines, which, again, defeats the purpose of the shared memory. Thus, in an implementation, in order to keep only shareable objects in shared memory and to prevent a reference from an object in shared memory to an object in a local memory, only "shareable" (or "shared") closures are stored in shared memory. A "shared closure" is a closure in which each of the closure's objects is "shareable".

A shareable object is an object that can be used by other virtual machines that store and retrieve objects from the shared memory. As discussed above, in an embodiment, one aspect of a shareable object is that it does not possess a reference to another object that is located in a virtual machine's local memory. Other conditions that an object must meet in order to be deemed shareable may also be required. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; and, 6) its finalize ( ) method is not overwritten.

Exceptions to the above criteria are possible if a copy operation used to copy a closure into shared memory (or from shared memory into a local memory) can be shown to be semantically equivalent to serialization and deserialization of the objects in the closure. Examples include instances of the Java 2 Platform, Standard Edition 1.3 java.lang.String class and java.util.Hashtable class.

A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

A computing system can execute program code stored by an article of manufacture. The applicable article of manufacture may include one or more fixed components (such as a hard disk drive or memory) and/or various movable components such as a CD ROM, a compact disc, a magnetic tape, etc. In order to execute the program code, typically instructions of the program code are loaded into the Random Access Memory (RAM); and, the processing core then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor (s) of the processing core.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for generating a memory structure, the method comprising:

mapping a contiguous memory window to a virtual address space, wherein the block size of the contiguous memory window is not fixed; and mapping a context to the contiguous memory window, wherein the context refers to a resource having a fixed block size, and wherein, as a result of mapping the context, the block size of the contiguous memory window is the same as the fixed block size of the resource.

2. The method of claim 1, wherein the context is a shared memory context to be shared by a plurality of worker processes in an application server instance.

3. The method of claim 1, wherein the context is a private memory context to be attached to only one of a plurality of worker processes in an application server instance.

4. The method of claim 1, further comprising:

subsequent to mapping the context, using an extended memory manager to extend the block size of the contiguous memory window by n blocks.

5. A method for generating a memory structure, the method comprising:

mapping a contiguous memory window to a virtual address space, wherein the block size of the contiguous memory window is not fixed; and mapping a context to the contiguous memory window, wherein the context refers to a resource having a fixed block size, and wherein, as a result of mapping the context, the block size of the contiguous memory window is a multiple of the fixed block size of the resource.

6. The method of claim 5, wherein the context is a shared memory context to be shared by a plurality of worker processes in an application server instance.

7. The method of claim 5, wherein the context is a private memory context to be attached to only one of a plurality of worker processes in an application server instance.

8. The method of claim 5, further comprising:

subsequent to mapping the context, using an extended memory manager to extend the block size of the contiguous memory window by n blocks.

9. An article of manufacture including program code which, when executed by a machine, causes the machine to perform the operations of:

mapping a contiguous memory window to a virtual address space, wherein the block size of the contiguous memory window is not fixed; and mapping a context to the contiguous memory window, wherein the context refers to a resource having a fixed block size, and wherein, as a result of mapping the context, the block size of the contiguous memory window is the same as the fixed block size of the resource.

10. The article of manufacture of claim 9, wherein the context is a shared memory context to be shared by a plurality of worker processes in an application server instance.

11. The article of manufacture of claim 9, wherein the context is a private memory context to be attached to only one of a plurality of worker processes in an application server instance.

12. The article of manufacture of claim 9, including additional program code which, when executed by the machine, causes the machine to perform the additional operation of:

subsequent to mapping the context, using an extended memory manager to extend the block size of the contiguous memory window by n blocks.

13. An article of manufacture including program code which, when executed by a machine, causes the machine to perform the operations of:

mapping a contiguous memory window to a virtual address space, wherein the block size of the contiguous memory window is not fixed; and mapping a context to the contiguous memory window, wherein the context refers to a resource having a fixed block size, and wherein, as a result of mapping the context, the block size of the contiguous memory window is a multiple of the fixed block size of the resource.

14. The article of manufacture of claim 13, wherein the context is a shared memory context to be shared by a plurality of worker processes in an application server instance.

15. The article of manufacture of claim 13, wherein the context is a private memory context to be attached to only one of a plurality of worker processes in an application server instance.

16. The article of manufacture of claim 13, including additional program code which, when executed by the machine, causes the machine to perform the additional operation of:

subsequent to mapping the context, using an extended memory manager to extend the block size of the contiguous memory window by n blocks.

* * * * *